March 20, 1945.   W. R. LOGAN   2,371,697
SWAGING TOOL
Filed June 8, 1943
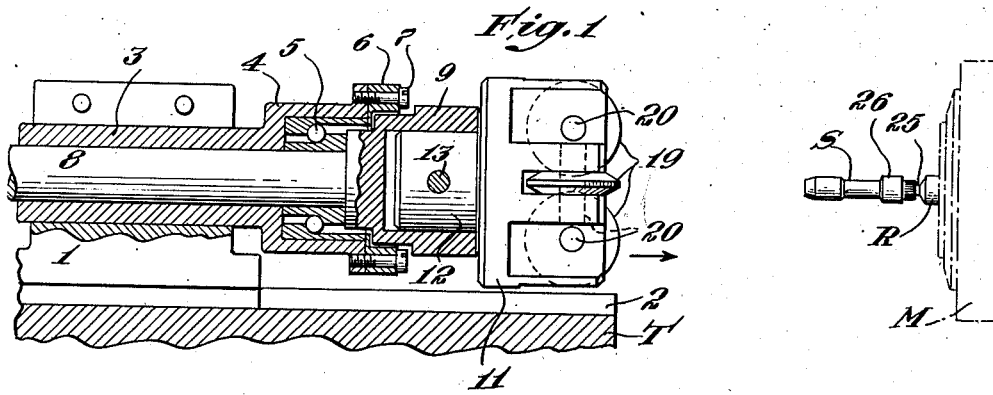
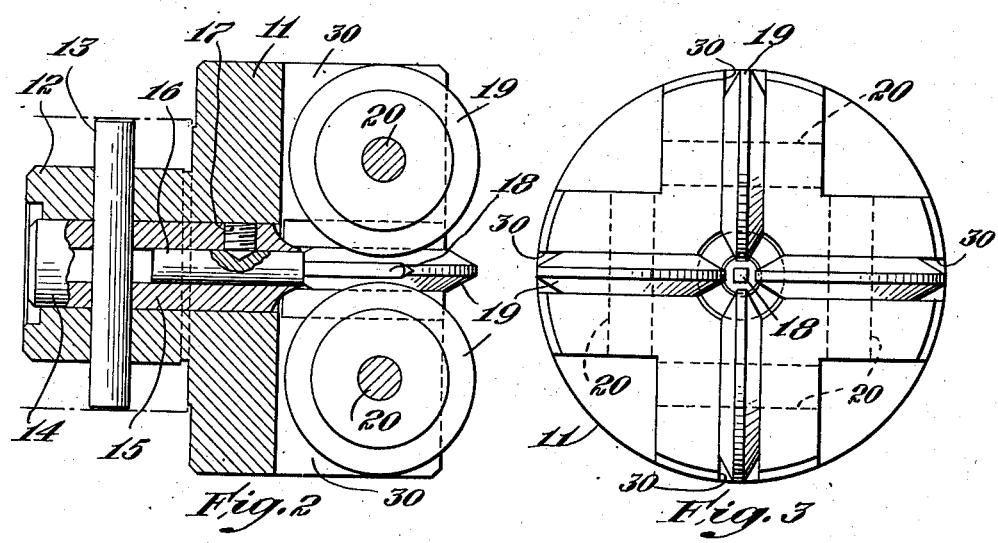
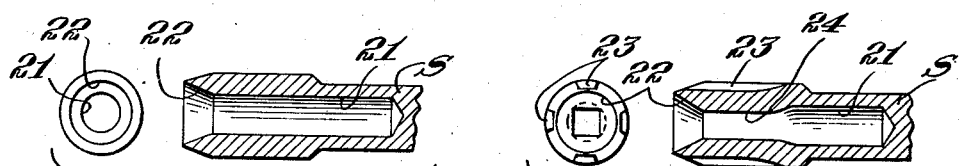
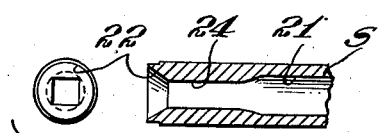
Inventor
Waldo R. Logan
by Roberts, Cushman & Woodbury
attys.

Patented Mar. 20, 1945

2,371,697

UNITED STATES PATENT OFFICE 2,371,697

SWAGING TOOL

Waldo R. Logan, Sudbury, Mass., assignor to Waltham Watch Company, Waltham, Mass., a corporation of Massachusetts Application June 8, 1943, Serial No. 490,063

10 Claims. (Cl. 80—12)

In the manufacture of various tubular articles it is desirable to have different cross-sectional contours inside and outside the article respectively. For example the outer ends of speedometer shafts should have a square or other non-circular cross-sectional contour on the inside for connection to the speedometer cable, whereas the outer periphery of the shaft is preferably circular in cross-section. Heretofore it has been customary to make these shafts out of rod stock, first drilling an axial socket in the outer end of each shaft and then swaging the tubular wall inwardly against a square arbor in a separate swaging machine having plungers which press against the four sides of the shaft.

Objects of the present invention are to provide an improved swaging tool which produces better results, which requires little power in operation, and which can be incorporated in a screw machine or turret lathe so that the shafts do not have to be transferred to a separate swaging machine but may be completely formed on the screw machine or turret lathe.

According to the present invention the tool comprises a holder and an arbor fixedly mounted on the holder for insertion into the end of the hollow shaft or other tubular part, together with rollers mounted on the holder beside the arbor to roll over the outside of the tube lengthwise thereof, the distance between each roller and the axis of the arbor being less than the exterior radius of the tube whereby, when the tube and tool are moved axially in relation to each other to bring them into telescoped relationship, the rollers swage the tubular wall inwardly against the arbor. Thus the tool may be mounted on the revolving head of a turret lathe or screw machine and perform its swaging operation merely by back and forth movement lengthwise of the rod or tube from which the parts are made.

The maximum diameter of the arbor is preferably less than the internal diameter of the tube to facilitate the insertion of the arbor into tube. By fixedly mounting the arbor in the holder and making the distances between the arbor and the peripheries of the respective rollers equal, there is little danger of breaking the arbor when the rollers swage the stock inwardly against the arbor. By making the maximum diameter of the arbor somewhat less than the internal diameter of the tube, the insertion of the arbor into the tube is facilitated. To produce a square cross-section a square arbor is employed and a roller mounted opposite each of the four sides of the square arbor. Thus the rollers of each opposed pair have their axes parallel to each other and perpendicular to the same axial plane of the arbor.

For the purpose of illustration a typical embodiment of the invention is shown in the accompanying drawing in which Fig. 1 is a longitudinal axial section, with parts shown in elevation, showing parts of a turret machine;

Fig. 2 is a longitudinal axial section of the swaging tool alone;

Fig. 3 is an end elevation of the tool; and

Figs. 4, 5 and 6 illustrate three stages in forming a shaft.

In the particular embodiment of the invention chosen for the purpose of illustration S represents a speedometer shaft which is being formed from a metallic rod R in a turret machine comprising the usual parts for clamping and rotating the stock, indicated generally at M, and a turret T carrying the various tools of which the aforesaid swaging tool is one. Each tool is carried by a slide 1 movable back and forth in a dovetail guideway 2. Rigidly mounted in the slide 1 is a sleeve 3 the forward end of which is enlarged as shown at 4. In the enlarged part 4 is mounted a ball-bearing 5 which is held in place by a ring 6 secured to the end of the sleeve by means of screws 7. Rotatably mounted in the sleeve 3 is a shaft 8 having a cup-shaped end 9 to receive the swaging tool.

The tool itself comprises a holder 11 having a rearwardly projecting hub 12 adapted to seat in the socket 9 of shaft 8, the tool being fastened to the shaft by means of a pin 13. Extending axially through the holder 11 and the hub 12 is a bore 14 to receive a sleeve 15 which is also held in position by means of pin 13. The aforesaid arbor comprises a cylindrical shank 16 fitting in the bore of the sleeve 15 and held in place by a set screw 17, the operative portion 18 of the arbor being square in cross-section as shown in Fig. 3. On each of the four sides of the arbor a roller 19 is journaled at 20 in a radial slot 30 to rotate in an axial plane with its axis perpendicular to the plane and its periphery adjacent the side of the arbor, each roller being spaced from the arbor the same distance. As shown in Fig. 3 the peripheries of the rollers are beveled down to an edge whose width is approximately equal to that of the arbor.

Prior to the swaging operation the shaft is preferably turned to the shape shown in Fig. 1; a cylindrical socket 21 is drilled in the end of the shaft (Fig. 4) and a flaring mouth 22 is reamed in the end of the socket. In this condition the shaft is telescoped with the aforesaid tool to swage the stock into the shape shown in Fig. 5 where the recesses 23 represent the marks of the rollers 19 on the outside of the stock and 24 indicates the square internal cross-section resulting from the swaging operation. After the swaging operation the outer periphery of the shaft is preferably turned down to remove the marks 23 as shown in Fig. 6. After the aforesaid operations the part 26 of the shaft (Fig. 1) is shaped in the form of a worm and the finished shaft is cut off at 25.

It should be understood that the present disclosure is for the purpose of illustration only and that this invention includes all modifications and equivalents which fall within the scope of the appended claims.

I claim:

1. A tool for swaging the end of a tube comprising a sleeve, an arbor fitted in one end of the sleeve with a part projecting beyond the end of the sleeve for insertion into the tube, a holder telescoped over said end of the sleeve with a portion projecting beyond said end of the sleeve around said part, rollers mounted on the projecting portion of the holder beside the arbor to roll over the outside of the tube lengthwise thereof, and means holding the arbor in fixed position in said sleeve so that the arbor continues to move into the tube as the rollers roll over the tube, the cross-sectional dimensions of the arbor being approximately constant throughout the length of the portion which telescopes into the tube, the distance between each roller and the axis of the arbor being less than the exterior radius of the tube, whereby when the tube and tool are moved axially in relation to each other to bring them into telescoped relationship the rollers swage the tube inwardly against the arbor to cause the interior of the tube to conform to the shape of the arbor.

2. A tool for swaging the end of a tube comprising a sleeve, an arbor fitted in one end of the sleeve with a part projecting beyond the end of the sleeve for insertion into the tube, the arbor being square in cross section and having flat sides, a holder telescoped over said end of the sleeve with a portion projecting beyond said end of the sleeve around said part, a roller mounted on the holder opposite each of said sides to roll over the outside of the tube lengthwise thereof, and means holding the arbor in fixed position in said sleeve so that the arbor continues to move into the tube as the rollers roll over the tube, the maximum diameter of the arbor being less than the internal diameter of the tube, the distances between said sides and the peripheries of the respective rollers being approximately equal, and the distance between each roller and the axis of the arbor being less than the exterior radius of the tube, whereby when the tube and tool are moved axially in relation to each other to bring them into telescoped relationship the rollers swage the tube inwardly against the arbor to cause the interior of the tube to conform to the shape of the arbor.

3. Apparatus for forming articles which have both circular and non-circular peripheries, comprising a support for a tube, a turret opposite the tube support, a holder reciprocatable back and forth on the turret toward and from the tube support, an arbor mounted on the holder for insertion into the tube, rollers mounted on the holder beside the arbor to roll over the outside of the tube lengthwise thereof, and means securing the arbor in fixed position in said holder so that the arbor continues to move into the tube as the rollers roll over the tube, the cross-sectional dimensions of the arbor being approximately constant throughout the length of the portion which telescopes into the tube, the distance between each rollers and the axis of the arbor being less than the exterior radius of the tube, whereby when the holder is advanced on the turret to bring the tube and arbor into telescoped relationship the rollers swage the tube inwardly against the arbor to cause the interior of the tube to conform to the shape of the arbor.

4. Apparatus for forming articles which have both circular and non-circular peripheries, comprising a support for a tube, a turret opposite the tube support, a holder reciprocatable back and forth on the turret toward and from the tube support, an arbor mounted on the holder for insertion into the tube, the arbor being square in cross section and having flat sides, a roller mounted on the holder opposite each of said sides to roll over the outside of the tube lengthwise thereof, and means securing the arbor in fixed position in said holder so that the arbor continues to move into the tube as the rollers roll over the tube, the maximum diameter of the arbor being less than the internal diameter of the tube, the distances between said sides and the peripheries of the respective rollers being approximately equal, and the distance between each roller and the axis of the arbor being less than the exterior radius of the tube, whereby when the holder is advanced on the turret to bring the tube and arbor into telescoped relationship the rollers swage the tube inwardly against the arbor to cause the interior of the tube to conform to the shape of the arbor.

5. A tool for swaging the end of a tube comprising a sleeve, an arbor fitted in one end of the sleeve with a part projecting beyond the end of the sleeve for insertion into the tube, a holder telescoped over said end of the sleeve with a portion projecting beyond said end of the sleeve around said part, means for supporting the tube independently of the arbor, rollers mounted on the projecting portion of the holder beside the arbor to roll over the outside of the tube lengthwise thereof, and means holding the arbor in fixed position in said sleeve so that the arbor continues to move into the tube as the rollers roll over the tube, the cross-sectional dimensions of the arbor being approximately constant throughout the length of the portion which telescopes into the tube, the distance between each roller and the axis of the arbor being less than the exterior radius of the tube so that, when the tube and tool are moved axially in relation to each other to bring them into telescoped relationship, the rollers swage the tube inwardly against the arbor to cause the interior of the tube to conform to the shape of the arbor, said sleeve and tube being rotatable in unison while the tube is being swaged.

6. A tool for swaging the end of a tube comprising a sleeve, an arbor fitted in one end of the sleeve with a part projecting beyond the end of the sleeve for insertion into the tube, the arbor being square in cross section and having flat sides, a holder telescoped over said end of the sleeve with a portion projecting beyond said end of the sleeve around said part, a roller mounted on the holder opposite each of said sides to roll over the outside of the tube lengthwise thereof, and means holding the arbor in fixed position in said sleeve so that the arbor continues to move into the tube as the rollers roll over the tube, the maximum diameter of the arbor being less than the internal diameter of the tube, the distances between said sides and the peripheries of the respective rollers being approximately equal, and the distance between each roller and the axis of the arbor being less than the exterior radius of the tube so that, when the tube and tool are moved axially in relation to each other to bring them into telescoped relationship, the rollers swage the tube inwardly against the arbor to cause the interior of the tube to conform to the shape of the arbor, said sleeve and tube being rotatable in unison while the tube is being swaged.

7. Apparatus for forming articles which have both circular and non-circular peripheries, comprising a support for a tube, a turret opposite the tube support, a sleeve mounted on the turret, an arbor fitted in one end of the sleeve with a part projecting beyond the end of the sleeve for insertion into the tube, said support supporting the tube independently of the arbor, a holder telescoped over said end of the sleeve with a portion projecting beyond said end of the sleeve around said part, rollers mounted on the projecting portion of the holder beside the arbor to roll over the outside of the tube lengthwise thereof, and means holding the arbor in fixed position in said sleeve so that the arbor continues to move into the tube as the rollers roll over the tube, the cross-sectional dimensions of the arbor being approximately constant throughout the length of the portion which telescopes into the tube, the distance between each roller and the axis of the arbor being less than the exterior radius of the tube, whereby when said sleeve is advanced on the turret to bring the tube and arbor into telescoped relationship the rollers swage the tube inwardly against the arbor to cause the interior of the tube to conform to the shape of the arbor.

8. Apparatus for forming articles which have both circular and non-circular peripheries, comprising a support for a tube, a turret opposite the tube support, a sleeve mounted on the turret, an arbor fitted in one end of the sleeve with a part projecting beyond the end of the sleeve for insertion into the tube, the arbor being square in cross section and having flat sides, said support supporting the tube independently of the arbor, a holder telescoped over said end of the sleeve with a portion projecting beyond said end of the sleeve around said part, a roller mounted on the holder opposite each of said sides to roll over the outside of the tube lengthwise thereof, and means holding the arbor in fixed position in said sleeve so that the arbor continues to move into the tube as the rollers roll over the tube, the maximum diameter of the arbor being less than the internal diameter of the tube, the distances between said sides and the peripheries of the respective rollers being approximately equal, and the distance between each roller and the axis of the arbor being less than the exterior radius of the tube, whereby when the holder is advanced on the turret to bring the tube and arbor into telescoped relationship the rollers swage the tube inwardly against the arbor to cause the interior of the tube to conform to the shape of the arbor.

9. Apparatus for forming articles which have both circular and non-circular peripheries, comprising a support for a tube, a turret opposite the tube support, a sleeve mounted on the turret, an arbor fitted in one end of the sleeve with a part projecting beyond the end of the sleeve for insertion into the tube, said support supporting the tube independently of the arbor, a holder telescoped over said end of the sleeve with a portion projecting beyond said end of the sleeve around said part, rollers mounted on the projecting portion of the holder beside the arbor to roll over the outside of the tube lengthwise thereof, and means holding the arbor in fixed position in said sleeve so that the arbor continues to move into the tube as the rollers roll over the tube, the cross-sectional dimensions of the arbor being approximately constant throughout the length of the portion which telescopes into the tube, the distance between each roller and the axis of the arbor being less than the exterior radius of the tube, whereby when said sleeve is advanced on the turret to bring the tube and arbor into telescoped relationship the rollers swage the tube inwardly against the arbor to cause the interior of the tube to conform to the shape of the arbor, said sleeve and tube being rotatable in unison while the tube is being swaged.

10. Apparatus for forming articles which have both circular and non-circular peripheries, comprising a support for a tube, a turret opposite the tube support, a sleeve mounted on the turret, an arbor fitted in one end of the sleeve with a part projecting beyond the end of the sleeve for insertion into the tube, the arbor being square in cross section and having flat sides, said support supporting the tube independently of the arbor, a holder telescoped over said end of the sleeve with a portion projecting beyond said end of the sleeve around said part, a roller mounted on the holder opposite each of said sides to roll over the outside of the tube lengthwise thereof, and means holding the arbor in fixed position in said sleeve so that the arbor continues to move into the tube as the rollers roll over the tube, the maximum diameter of the arbor being less than the internal diameter of the tube, the distances between said sides and the peripheries of the respective rollers being approximately equal, and the distance between each roller and the axis of the arbor being less than the exterior radius of the tube, whereby when the holder is advanced on the turret to bring the tube and arbor into telescoped relationship the rollers swage the tube inwardly against the arbor to cause the interior of the tube to conform to the shape of the arbor, said sleeve and tube being rotatable in unison while the tube is being swaged.

WALDO R. LOGAN.